United States Patent [19]

Shinohara et al.

[11] Patent Number: 5,406,430
[45] Date of Patent: Apr. 11, 1995

[54] CASSETTE TAPE MOUNT FOR USE IN A CASSETTE TAPE RECORDER

[75] Inventors: Isao Shinohara, Ikoma; Yasunari Toyama, Osaka, both of Japan

[73] Assignee: Matsushita Electric Industrial Co., Ltd., Osaka, Japan

[21] Appl. No.: 936,591

[22] Filed: Aug. 27, 1992

[30] Foreign Application Priority Data

Aug. 29, 1991 [JP] Japan .................. 3-218333
Apr. 28, 1992 [JP] Japan .................. 4-109438

[51] Int. Cl.$^6$ ............... G11B 5/008; G11B 33/02
[52] U.S. Cl. ...................... 360/96.5; 369/77.2
[58] Field of Search .............. 360/96.5, 94, 130.21, 360/96.1, 96.5, 132, 130.21; 369/77.2, 77.1

[56] References Cited

U.S. PATENT DOCUMENTS

| | | | |
|---|---|---|---|
| 4,614,270 | 9/1986 | Oishi . | |
| 5,119,358 | 6/1992 | Soga | 369/77.2 |
| 5,153,867 | 10/1992 | Inoue | 369/77.2 |
| 5,172,284 | 12/1992 | Ohshima | 360/94 |
| 5,231,553 | 7/1993 | Weber et al. | 360/96.5 |
| 5,237,479 | 8/1993 | Vollmann | 360/132 |

FOREIGN PATENT DOCUMENTS

| | | |
|---|---|---|
| 0311390 | 4/1989 | European Pat. Off. . |
| 0406943 | 1/1991 | European Pat. Off. . |
| 0434143 | 6/1991 | European Pat. Off. . |
| 0438144 | 7/1991 | European Pat. Off. . |
| 498362 | 8/1992 | European Pat. Off. ........ 360/71 |
| 3433705 | 4/1985 | Germany . |

*Primary Examiner*—Robert S. Tupper
*Assistant Examiner*—Allen Cao
*Attorney, Agent, or Firm*—Ratner & Prestia

[57] ABSTRACT

A tape cassette mount for receiving different types of tape cassettes in a tape cassette recorder has a shutter operating mechanism including an arm and a guide roller provided at an end of the arm. The guide roller rotates while sliding along a guide of the tape cassette, thereby sliding the shutter open. When a different type of tape cassette having no shutter is inserted, the arm is pressed and thus pivoted by the tape cassette to a retracting position without damaging the tape cassette or a magnetic tape.

8 Claims, 8 Drawing Sheets

CASSETTE TAPE MOUNT FOR USE IN A CASSETTE TAPE RECORDER

BACKGROUND OF THE INVENTION

1. Field of the Invention

The present invention relates to a cassette tape mount for use in a cassette tape recorder in which different types of tape cassettes can be mounted, for example, a tape cassette having a slidable shutter which covers an opening for exposing a magnetic tape, such as a digital compact cassette (hereinafter, referred to as a DCC); and a tape cassette having no shutter wherein a magnetic tape is exposed through an opening, such as an analog compact cassette (hereinafter, referred to as an ACC).

2. Description of the Prior Art

Recently, digital audio equipment has been actively developed for improving reproduction quality. In such a trend, DCCs capable of digital recording and digital reproduction have been a main target for the development. As tape recorders for a DCC, two systems are proposed: R-DAT using a rotary head, and S-DAT using a fixed head. The fixed head of the S-DAT has a similar construction with that of a tape recorder for an ACC which is in general use today. Accordingly, the S-DAT system has an advantage that a DCC which is similar in construction with the ACC can be used. A cassette tape mount which can be used both for a DCC and an ACC has been demanded.

A DCC usually has a shutter on a front face thereof. The shutter is opened by sliding with respect to a cassette main body to expose a stretched portion of a magnetic tape. When the shutter is opened, the stretched portion of the magnetic tape is exposed through openings in the front face of the cassette main body.

An ACC has a cassette main body which holds a magnetic tape with a portion of the magnetic tape in a stretched condition. The cassette main body has uncovered openings in a front face for exposing the magnetic tape, and a portion of the cassette main body in the vicinity of the openings is thicker in a width direction of the magnetic tape than a remaining portion thereof. This portion will be referred to as the thick portion, hereinafter. In the DCC and the ACC, a magnetic head, pinch rollers and the like are inserted into the openings to detect information recorded on the magnetic tape. In this specification, the "front" face of the tape cassette is the side of the DCC and the ACC which is inserted first into the cassette tape mount. The "back" side of the tape cassette is opposite to the front face.

As a cassette tape mount for receiving both of a DCC and an ACC, the one shown in FIG. 11 has been proposed by the applicant of the present invention. In FIG. 11, a cassette tape mount has a shutter operating mechanism 71 for sliding open a shutter of a DCC to uncover openings of the DCC. The shutter operating mechanism 71 includes a pivotable arm 72 which is pressed and thus pivoted by a front face of the DCC which is being inserted. The arm 72 is pivoted while sliding along a guide 80 of a cassette main body. The arm 72 has a shutter operating shaft 77 at an end hereof, and the shutter operating shaft 77 has a contact portion 77a which contacts the shutter of the DCC.

When the DCC is first inserted into the cassette tape mount, the contact portion 77a contacts the cassette main body and slides along the guide 80, and contacts and slides the shutter open with respect to the cassette main body. When the shutter has completely uncovered the openings, the contact portion 77a is put into a lock groove formed in connection with the guide 80, thereby locking the shutter and prohibiting the pivoting of the arm 72 and closing of the shutter.

In order to allow the use of an ACC in a tape mount having the above construction, it is required to prevent the shutter operating mechanism 71 from contacting the exposed magnetic tape when an ACC is inserted. The shutter operating mechanism 71 is controlled so that the contact portion 77a will contact a front face of a thick portion of the ACC and thus the arm is pressed and pivoted by the ACC. When the ACC is completely inserted into the cassette tape mount, the arm 72 is pushed by the front face of the ACC into a fully retracted position.

In the shutter operating mechanism 71 having the above described construction, the contact portion 77a is integrally formed with the shutter operating shaft 77 which is fixed at the end of the arm 72. Accordingly, when a DCC is being inserted, the contact portion 77a does not smoothly slide along the cassette main body or along the shutter. After being recessed in the look groove, the contact portion 77a is not smoothly taken out of the lock groove, thereby possibly causing the contact portion 77a to be pressurized by the shutter. When an ACC is being inserted, the contact portion 77a can come out of engagement from the thick portion, thereby causing the arm 72 to enter the opening and damage the magnetic tape. Such shutter operating mechanisms do not smoothly operate.

SUMMARY OF THE INVENTION

The cassette tape mount for use in a cassette tape recorder according to the present invention receives a tape cassette which houses a magnetic tape having a stretched portion and includes an opening in a face of the tape cassette for exposing the stretched portion of the magnetic tape. This tape cassette further has a shutter over the face which is slidable with respect to the face to cover and uncover the opening. The cassette tape mount according to the present invention also receives a tape cassette which houses a magnetic tape having a stretched portion and includes an uncovered opening for exposing the stretched portion of the magnetic tape. This tape cassette further has a thick portion about the opening. The thick portion is thicker in a width direction of the magnetic tape than the face of the tape cassette having a shutter. The cassette tape mount includes a shutter operating mechanism for sliding open the shutter to uncover the opening when the tape cassette is inserted from the face into the cassette tape mount. The shutter operating mechanism includes a pivotable arm which is pressed and thus pivoted by a face having an opening of an inserted tape cassette inserted into the cassette tape mount; a shutter operating shaft provided at an end of the arm and having a cassette contact portion which is slidable along the face of tape cassette; and a guide roller journalled to rotate about the shutter operating shaft and rotate against the shutter of the tape cassette to engage an edge of the shutter and thus to slide the shutter open across the face of the tape cassette to uncover the opening.

In an embodiment according to the present invention, the shutter operating mechanism includes a contact plate provided on a surface of the arm. The arm is positioned along a periphery of the thick portion of the tape cassette when the tape cassette is inserted into the cassette tape mount.

In an embodiment according to the present invention, the arm has a flange at a tip thereof for engagement with the periphery of the thick portion of the tape cassette.

In an embodiment according to the present invention, the shutter operating mechanism includes a contact roller journalled to rotate about the shutter operating shaft and rotate while sliding along the tape cassette.

According to the present invention, when a tape cassette having a shutter is being inserted into the cassette tape mount, a guide roller of a shutter operating mechanism contacts the shutter and slides the shutter open by rotating against an edge of the shutter, thereby sliding the shutter smoothly so as to uncover an opening of the tape cassette. In the case when a contact roller contacts a cassette main body of the tape cassette and rotates while sliding along the cassette main body, the arm is more smoothly operated. Thus, the tape cassette is smoothly received and mounted in the cassette tape mount.

Even when a different type of tape cassette having no shutter is being inserted, a cassette contact plate of the shutter operating mechanism contacts a periphery of a portion of a face provided in the vicinity of an opening of the tape cassette. Since a flange provided at a tip of the arm is in engagement with the periphery, the arm is smoothly operated without entering the opening.

Accordingly, both of a DCC and an ACC can smoothly be mounted on the cassette tape mount according to the present invention.

Thus, the invention described herein makes possible the advantages of providing (1) a cassette tape mount for use in a cassette tape recorder which has a shutter operating mechanism for smoothly sliding the shutter of a tape cassette with respect to a cassette main body so as to smoothly open a shutter of the tape cassette and; (2) a cassette tape mount for use in a cassette tape recorder for receiving and mounting a tape cassette without a shutter as well as a tape cassette having a shutter.

These end other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating examples with reference to the accompanying drawings.

EXAMPLE 1

Figure 1:
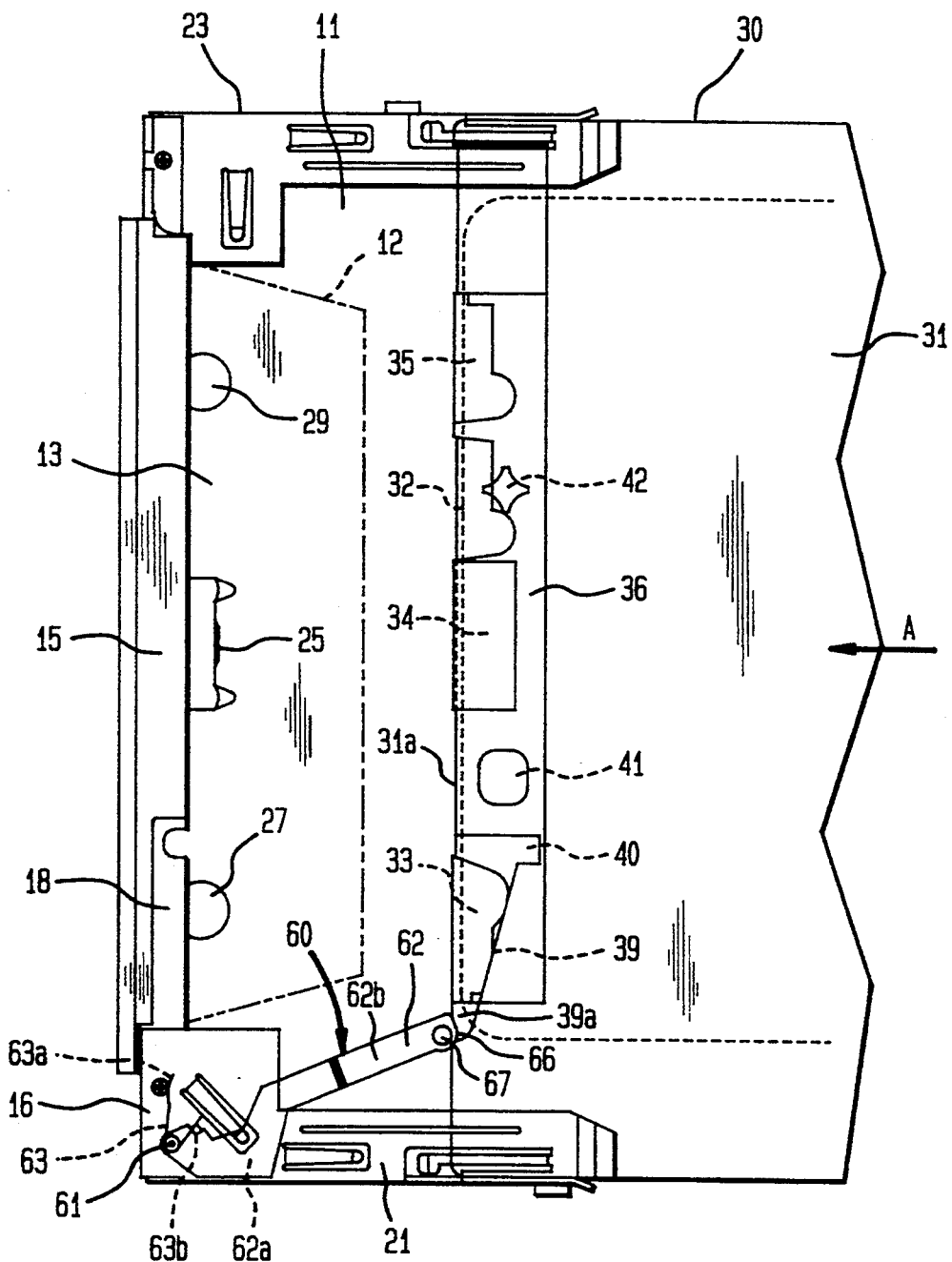
FIG. 1 is a plan view of a cassette tape mount for use in a cassette tape recorder according to the present invention in the case where a DCC is being inserted into the mount.
Figure 2:
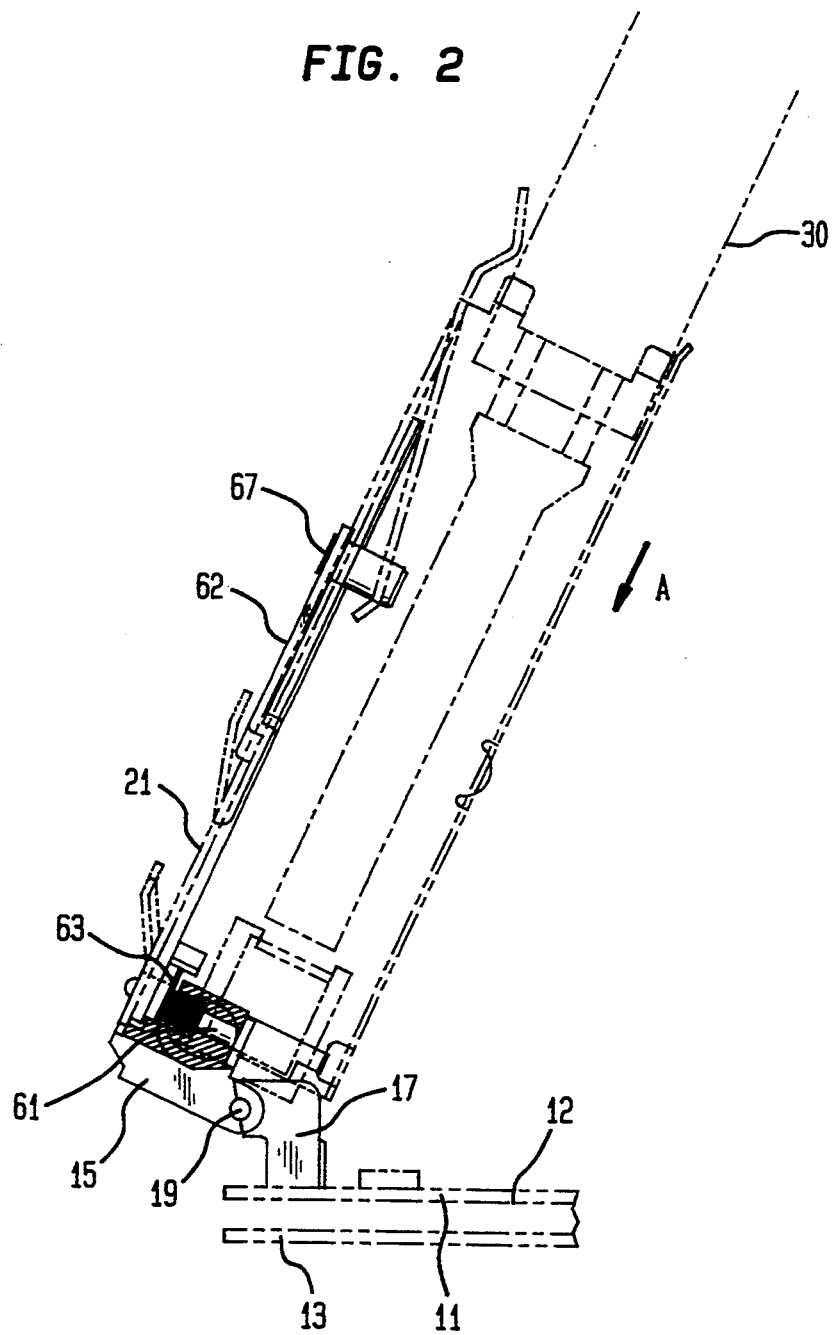
FIG. 2 is a side view of the cassette tape mount of FIG. 1.

With reference to FIGS. 1 and 2, the cassette tape mount for use in a cassette tape recorder according to a first example of the present invention includes an upper plate 11, a lower plate 13 parallel with the upper plate 11, and a holder main body 15 attached along a periphery of the upper plate 11. The holder main body 15 is pivotably supported by a pair of holder supporters 17 (as shown in FIG. 2) by supporting shafts 19. The holder supporters 17 are provided at opposite side portions of the upper plate 11, and the supporting shafts 19 are also provided at opposite side portions of the upper plate 11. The holder main body 15 has opposed cassette holders 21 and 23 extending perpendicular to the holder main body 15 from both ends thereof. When a DCC or an ACC is inserted along the cassette holders 21 and 23, side portions of the DCC or the ACC are guided and held by the cassette holders 21 and 23.

Figure 3A:
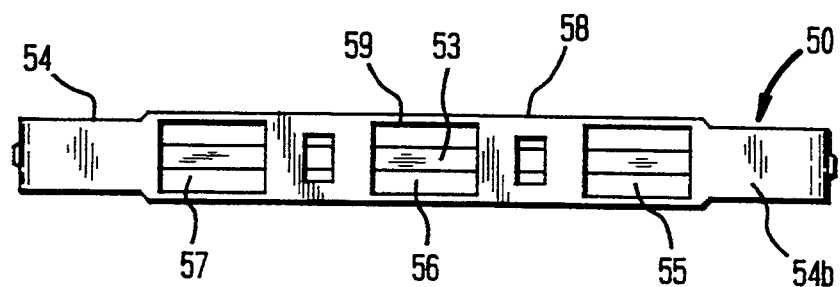
FIG. 3A is a front view of an ACC mountable in the cassette tape mount according to the present invention.
Figure 3B:
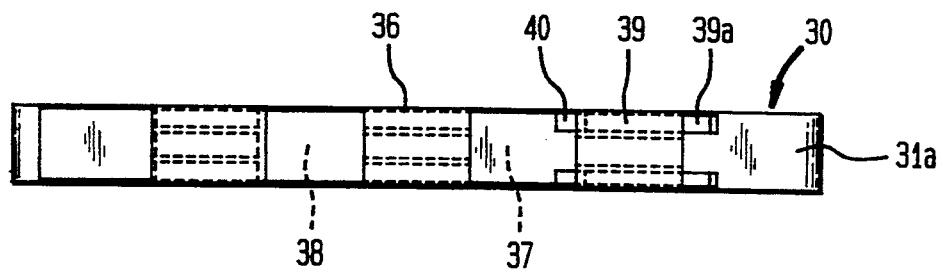
FIG. 3B is a front view of a DCC mountable in the cassette tape mount according to the present invention.
Figure 3C:
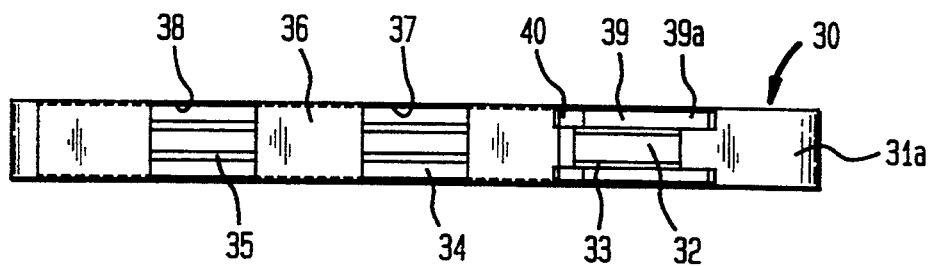
FIG. 3C is a view illustrating an operation of the DCC of FIG. 3B.

With continuing reference to FIGS. 1 and 2, a DCC 30 is shown being inserted into the cassette tape mount along the cassette holders 21 and 23. The DCC 30 includes a cassette main body 31 which houses a magnetic tape 32. The magnetic tape 32 is wound around a pair of reels (not shown) provided inside the cassette main body 31, and a portion of the magnetic tape 32 is stretched between the reels. The portion of the magnetic tape 32 stretched between the reels is parallel with a front face 31a of the cassette main body 31. The front face 31a has three openings 33, 34 and 35 (FIGS. 3B and 3C) for exposing The magnetic tape 32 and arranged in a direction in which the magnetic tape 32 is stretched (hereinafter, referred to as the tape stretching direction). Into the opening 34 disposed at a center of the front face 31a, a magnetic head 25 of the cassette tape mount protrudes during operation of the cassette tape recorder. A first pinch roller 27 and a second pinch roller 29 provided on the holder main body 15 protrude into openings 33 and 35, respectively, to engage the stretched portion of the magnetic tape 32 upon insertion of the DCC 30 into the cassette tape mount. The openings 33, 34 end 35 are covered by a shutter 36 which is laterally slidable along the front face 31a of the cassette main body 31 in the tape stretching direction. The shutter 36 is biased by a spring (not shown) provided between the cassette main body 31 and the shutter 36. As is shown in FIGS. 3B and 3C, the shutter 36 has two openings 37 and 38 arranged in the tape stretching direction. When the shutter 36 is slid open to uncover the opening 33 against a force of the spring, the openings 37 and 38 of the shutter 36 are respectively aligned with the openings 34 and 35 of the cassette main body 31, thereby uncovering the openings 34 and 35.

Figure 5:
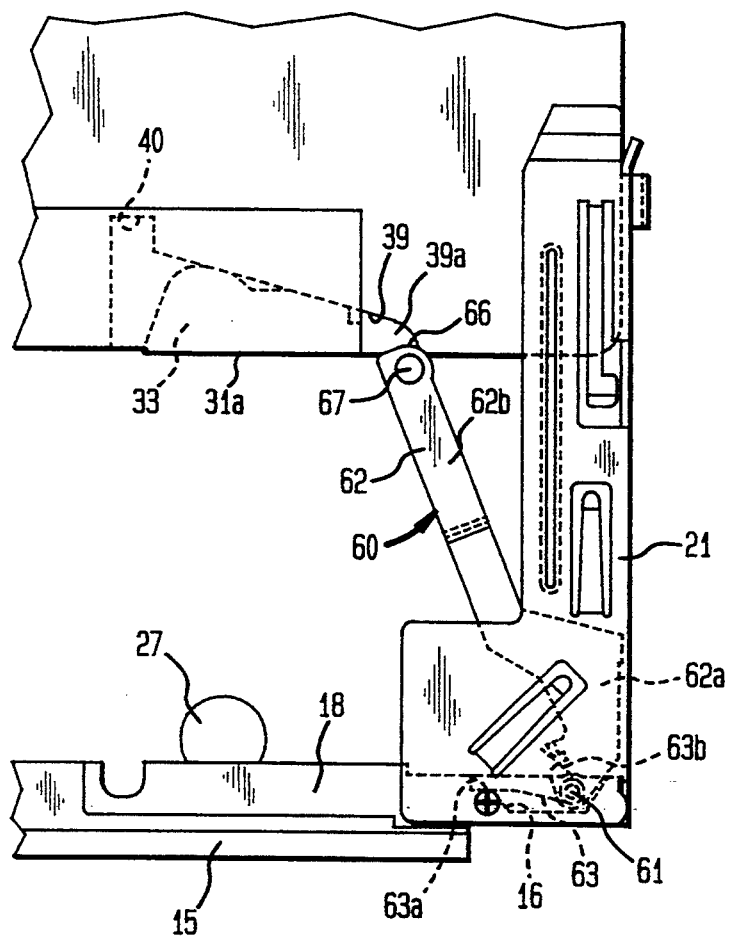
FIG. 5 is a plan view of a shutter operating mechanism of the cassette tape mount according to the present invention in the case where a DCC is being inserted.

As is shown in FIG. 5, the opening 33 includes a guide 39 which is angled diagonally away from the front face 31a of the cassette main body 31. An end portion of the guide 39 extends beyond the opening 33 toward a side edge of the cassette main body 31 so that a notch 39a is exposed on the front face 31a of the cassette main body 31 when the shutter 36 is covering the openings 33 through 35. Opposite the notch 39a, the guide 39 includes a lock groove 40 which extends inward (toward a back side of the DCC 30) perpendicular to the tape stretching direction.

The shutter 36 is folded over the front face 31a of the cassette main body 31 so as to cover a portion of a top surface and a portion of a bottom surface of the cassette main body 31 adjacent to the front face 31a. The top surface of the cassette main body 31 is farther from the upper plate 11 than the bottom surface thereof is. When the shutter 36 is slid open to uncover the openings 33 through 35, a first positioning hole 41 and a second positioning hole 42 on the bottom surface of the cassette main body 31 are also uncovered.

Figure 4:
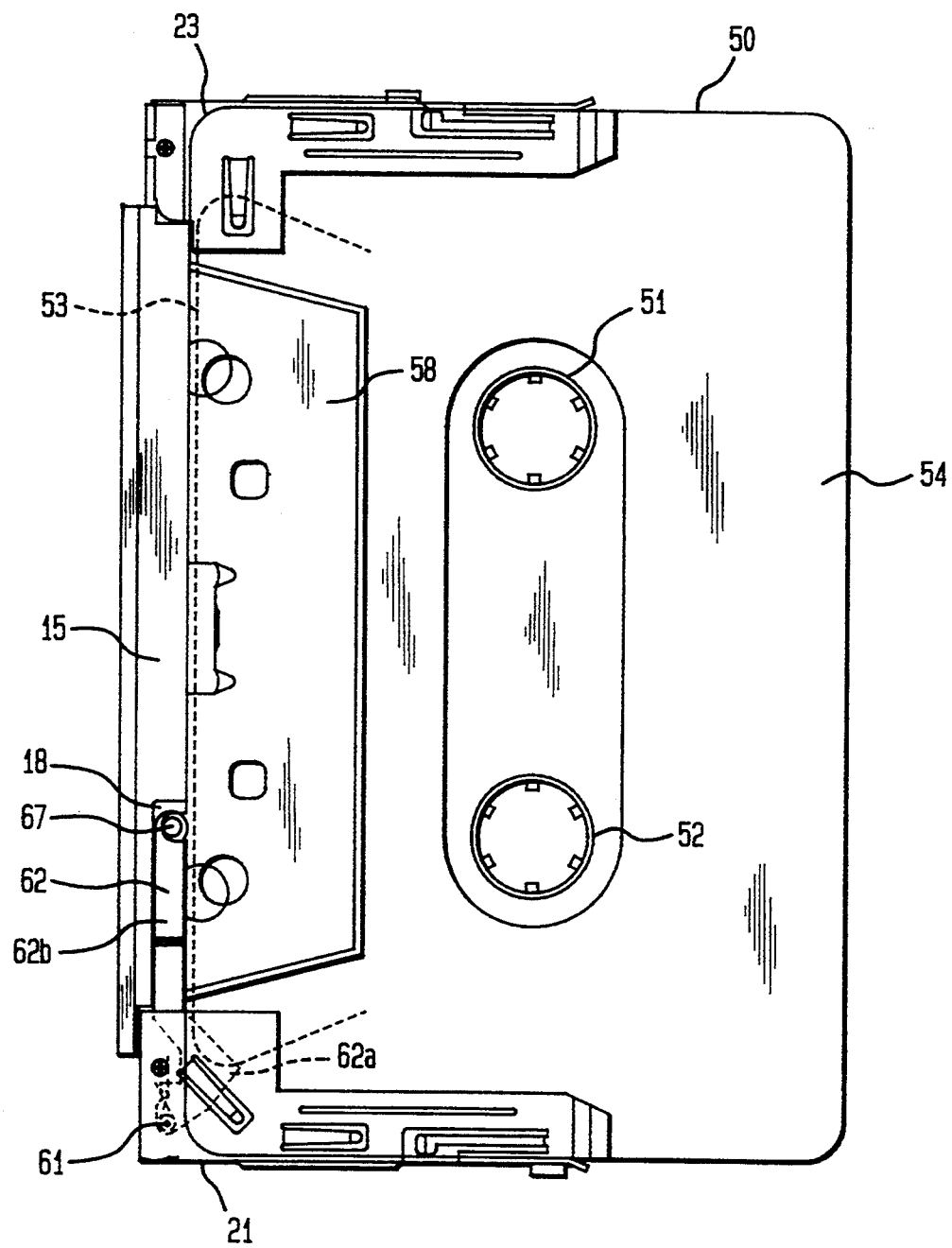
FIG. 4 is a plan view of the cassette tape mount according to the present invention in the case of mounting an ACC.

FIG. 4 shows an ACC 50 having no shutter mounted in the cassette tape mount. The ACC 50 includes a cassette main body 54 which houses a magnetic tape 53 and a pair of reels 51 and 82 around which the magnetic tape 53 is wound. A portion of the magnetic tape 53 is stretched between the reels 51 and 52 parallel with a front face 54b (FIG. 3A) of the cassette main body 54. As is shown in FIG. 3A, the front face 54b has three openings 55, 56 and 57 arranged in a direction in which the magnetic tape 53 is stretched (hereinafter, referred to as the tape stretching direction). Upon insertion of the ACC 50 into the cassette tape mount, the magnetic head 25 of the cassette tape mount protrudes into the opening 56 to come in contact with the stretched portion of the magnetic tape 53. The first and the second pinch rollers 27 and 29 of the cassette tape mount also protrude into the openings 55 and 57, respectively. The cassette main body 54 has a thick portion 58 in which the openings 55 through 57 are formed end which is thicker in a width direction of the magnetic tape 53 than a remaining portion of the ACC 50 end also than the DCC 30.

As is shown in FIGS. 1 and 2, the upper plate 11 of the cassette tape mount has a cutout 12 against which the thick portion 58 (FIG. 4) abuts when the ACC 50 is mounted. The lower plate 13 is fixed to the upper plate 11 through a plurality of shafts and pins (not shown) with a specified distance therebetween to cover the cutout 12.

The first and second pinch rollers 27 and 29 are each rotatably supported at an end of a pinch roller arm (not shown) and extend parallel with the holder main body 15. The pinch roller arms are each biased by a spring wound around an arm shaft thereof to position the pinch rollers 27 and 29 away from a back wall of the holder main body 15.

As is shown in FIG. 5, a shutter operating mechanism 60 for sliding the shutter 36 of the DCC 30 is provided in the vicinity of the first cassette holder 21, The shutter operating mechanism 60 includes an arm 62 and a torsion spring 63 about a supporting shaft 61 which provides a pivot point for the arm 62. The torsion spring 63 biases the arm 62 away from the holder main body 15. The arm 62 includes a base portion 62a and a leading portion 62b. The base portion 62a of the arm 62 is rotatably supported by a supporting shaft 61 which is supported by the holder main body 15 and the first cassette holder 21. The leading portion 62b is extended from the base portion 62a. The base portion 62a is substantially flat to be flush against the top surface of the DCC 30.

The supporting shaft 61 is provided in a groove 16 of the holder main body 15. The torsion spring 63 is in engagement with the supporting shaft 61. An end 63a of the torsion spring 63 is fixed by a wall of the groove 16, and another end 63b of the torsion spring 63 is in contact with a projection of the arm 62 projecting downward from the base portion 62a. The arm 62 is biased by the torsion spring 63 to be inclined so as to position the leading portion 62b of the arm 62 diagonally across the open cavity of the cassette tape mount.

Figure 6:
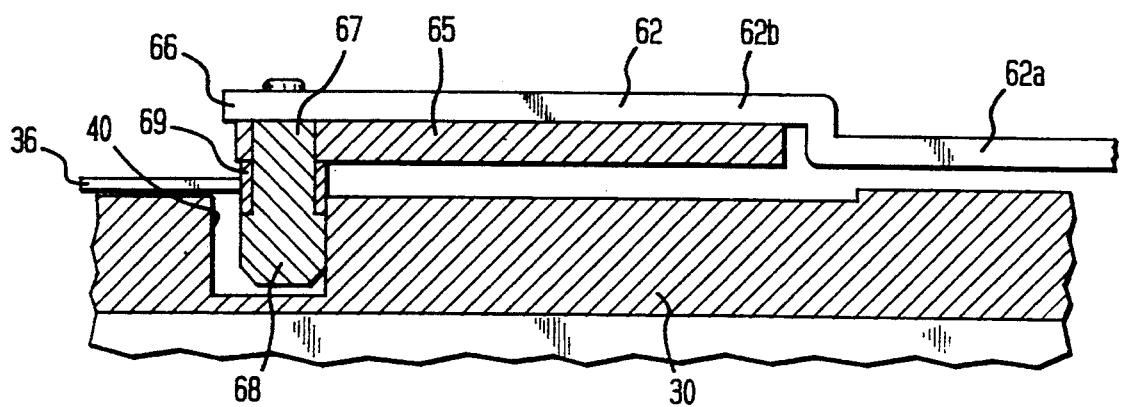
FIG. 6 is a cross sectional view of the shutter operating mechanism of FIG. 5 An the case of mounting a DCC.
Figure 8:
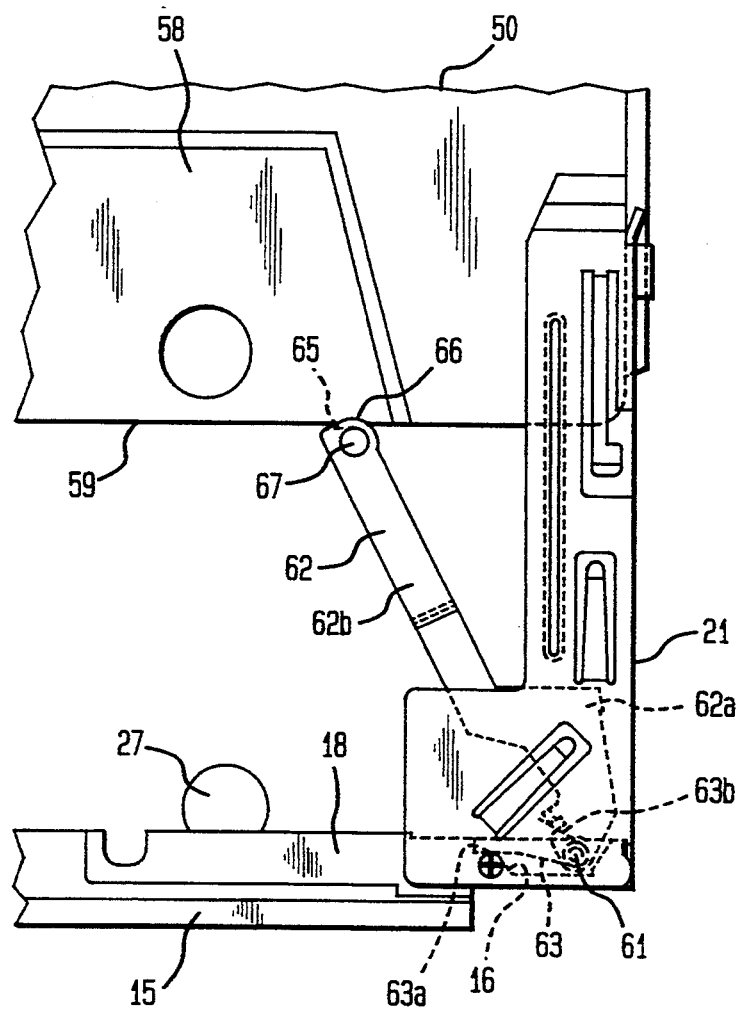
FIG. 8 is a plan view of the shutter operating mechanism of the cassette tape mount according to the present invention in the case where an ACC is being inserted.

As is shown in FIG. 6, the arm 62 has a step between the base portion 62a and the leading portion 62b, the step having a height which is substantially identical with the thickness of the base portion 62a. The leading portion 62b of the arm 62 has a contact plate 65 for making the leading portion 62b flush with the base portion 62a. The leading portion 62b of the arm 62 has a flange 66 projecting toward the first cassette holder 21. AS is shown in FIG. 8, when an ACC 50 is inserted along the first and the second cassette holders 21 and 23, the contact plate 65 contacts an upper front periphery 59 of the thick portion 58 of the ACC 50. (The upper front periphery 59 of the thick portion 58 is farther from the upper plate 11 than a lower front periphery thereof is.) The flange 66 engages the upper front periphery 59, thereby preventing the contact plate 65 from entering the opening 55 and damaging the magnetic tape 53. As the ACC 50 is further inserted into the cassette tape mount, the arm 62 is pivoted toward the holder main body 15, and when the ACC 50 is completely inserted, the leading portion 62b of the arm 62 and the contact plate 65 are fully recessed in an arm housing portion 18 parallel with the holder main body 15 with the contact plate 65 being in line with the upper front periphery 59. The contact plate 65, which is formed of a resin, is smoothly slid along the upper front periphery 59 without damaging the upper front periphery 59.

With reference to FIG. 6, the arm 62 has a shutter operating shaft 67 at an end thereof. The shutter operating shaft 67 which extends downward perpendicular to the length of the arm 62 through the contact plate 65 is fixed to the arm 62 by caulking or the like. A guide roller 69 is journalled to rotate about the shutter operating shaft 67. The shutter operating shaft 67 has a contact portion 68 at a lower end thereof. The contact portion 68 has a larger diameter than that of the guide roller 69 and thus retains the guide roller 69 on the shutter operating shaft 67. When the DCC 30 is first inserted into the cassette tape mount, the guide roller 69 and the contact portion 58 are positioned in the notch 39a of the guide 39. Since the diameter of the contact portion 68 is larger than that of the guide roller 69, the contact portion 68 contacts the guide 39 but the guide roller 69 does not. When the DCC 30 is further inserted, the contact portion 68 is slid along the guide 39. Thus, the guide roller 69 contacts an edge of the shutter 36 and rotates while sliding along the edge of the shutter 36, thereby sliding open the shutter 36 against the force of the spring. The contact portion 68 is not in contact with the shutter 36. When the DCC 30 is further inserted, the contact portion 68 and the guide roller 69 are recessed into the lock groove 40. At this point, the shutter 36 is locked while uncovering the openings 33 through 35 as is shown in FIG. 3C. Even if the DCC 30 is erroneously inserted from the back side thereof or the arm 62 is forcibly moved by an external force, the arm 62 is protected from breaking by the arm housing portion 18.

The DCC 30 is mounted in a cassette tape mount having the above construction in the following manner.

Figure 7:
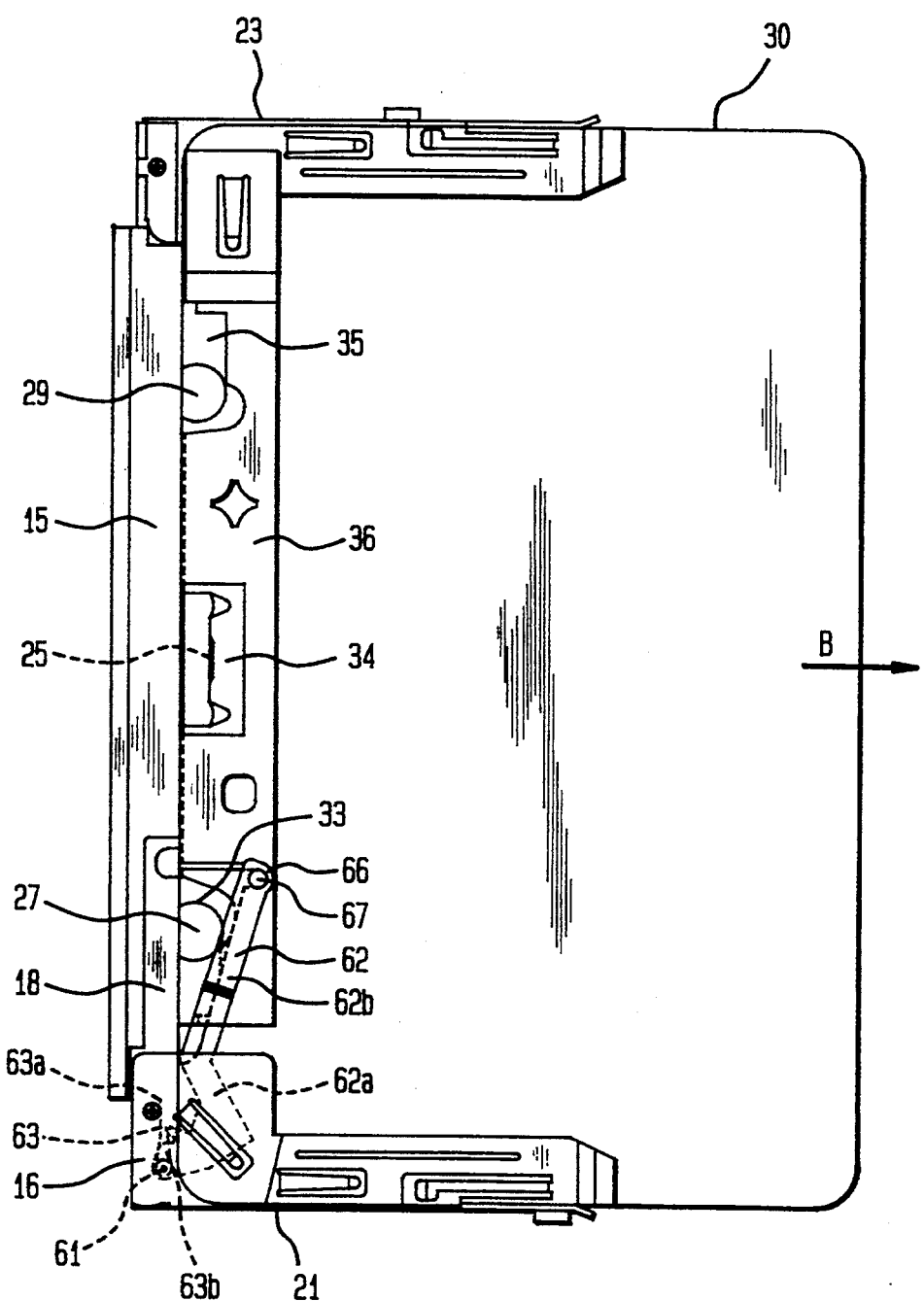
FIG. 7 As a plan view of the cassette tape mount according to the present invention in the case of mounting a DCC.

As is shown in FIG. 2, the holder main body 15 is pivoted until the first and the second cassette holders 21 and 23 are slanted with respect to the upper plate 11. The DCC 30 is inserted along the first and the second cassette holders 21 and 23 from the front face 31a having the openings 33 through 35 in a direction of an arrow A in FIGS. 1 and 2. At this point, the arm 62 remains biased away from the holder main body 15. When the DCC 30 is further inserted, the contact portion 68 and the guide roller 69 are put into the notch 39a of the DCC 30 (FIG. 1). When the DCC 30 is further inserted, the contact portion 68 is slid along the guide 39, and thus the guide roller 69 contacts the edge of the shutter 36. When the DCC 30 is further inserted, the guide roller 69 rotates while sliding along the edge of the shutter 36, thereby sliding open the shutter 36 with respect to the cassette main body 31. Since the contact portion 68 is not in contact with the shutter 36, the guide roller 69, which is rotating, smoothly slides open the shutter 36. Thus, the openings 33 through 35 are uncovered. Then, the contact portion 68 and the guide roller 69 are recessed in the lock groove 40. In this state, the shutter 36 is locked with the openings 33 through 35 being uncovered. Then, the first end the second cassette holders 21 and 23 are pivoted to be parallel with the upper plate 11. The magnetic head 25 is inserted into the opening 34, and the pinch rollers 27 and 29 are inserted into the openings 33 and 35 (FIG. 7). In this state, recording to and reproduction from the magnetic tape 32 is possible.

The DCC 30 is removed from the cassette tape mount in the following manner.

The first and the second cassette holders 21 and 23 are pivoted away from the upper plate 11, and the DCC 30 is pulled out in the direction of an arrow B in FIG. 7. The contact portion 68 is slid along the lock groove 40, and thus the guide roller 69 is smoothly released from the look groove 40 while rotating along the edge of the shutter 36. When the DCC 30 is pulled further out, the contact portion 68 is slid along the guide 39 by the force of the spring while the guide roller 69 rotates while sliding along the edge of the shutter 36. Thus, the arm 62 is pivoted toward the first cassette holder 21. When the contact portion 68 reaches the notch 39a, the shutter 36 covers the openings 33 through 35, and the DCC 30 is removed from the cassette tape mount.

An operation for mounting an ACC 50 in the cassette tape mount will be described, hereinafter.

Figure 9:
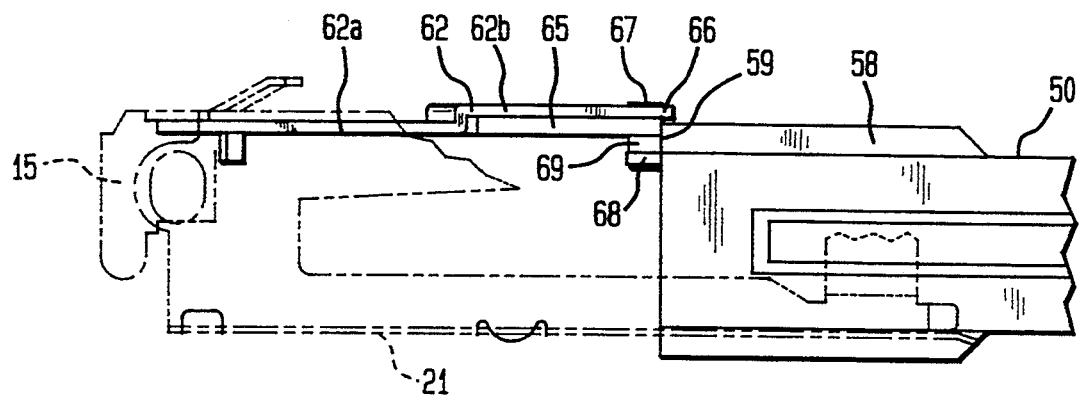
FIG. 9 is a cross sectional view of the shutter operating mechanism in the case where an ACC is being inserted.

The holder main body 15 is pivoted until the first and the second cassette holders 21 and 23 are slanted with respect to the upper plate 11. The ACC 50 is inserted along the first and the second cassette holders 21 and 23 from the front face 54b having the thick portion 58. When the ACC 50 is further inserted, the contact plate 65 contacts the upper front periphery 59 of the thick portion 58 as is shown in FIGS. 8 and 9. At this point, the flange 66 is engaged with the upper front periphery 59, thereby preventing the contact plate 65 from entering the opening 55. When the ACC 50 is further inserted, the contact plate 65 is slid along the upper front periphery 59, thereby pivoting the arm 62 toward the holder main body 15. The ACC 50 is further inserted until the arm 62 and the contact plate 65 are recessed in the arm housing portion 18 as is shown in FIG. 4. Then, the first and the second cassette holders 21 and 23 are pivoted to be parallel with the upper plate 11. In this state, recording to and reproduction from the magnetic tape 53 is possible.

For removing the ACC 50 from the cassette tape mount, the arm 62 and the other members of the cassette tape mount and the ACC 50 are operated oppositely.

For mounting the DCC 30 into the cassette tape mount according to the first example of the present invention, the shutter 36 of the DCC 30 is smoothly slid open with respect to the cassette main body 31 owing to the guide roller 69 rotating against the edge of the shutter 36. Since the contact portion 68 has a larger diameter than that of the guide roller 69, only the guide roller 69 which is rotating contacts the shutter 36, but the contact portion 68 which does not rotate is out of contact therefrom. This improves durability of the edge of the shutter 36.

The leading portion 62b of the arm 62 is biased toward the first cassette holder 21 by the torsion spring 63 engaged with the supporting shaft 61 which supports the base portion 62a of the arm 62. The DCC 30 is inserted along the first and the second cassette holders 21 and 23 against the force of the spring for biasing the arm 62. Owing to such a construction, the DCC 30 is positioned in the state of being pressed onto an inner side surface of the first cassette holder 21. Accordingly, the shutter 36 is reliably slid by the guide roller 69.

For mounting the ACC 50, the flange 66 of the arm 62 is engaged with the upper front periphery 59, and thus the contact plate 65 contacts the upper front periphery 59. Owing to such a construction, the arm 62 is prevented from entering the opening 55.

EXAMPLE 2

Figure 10:
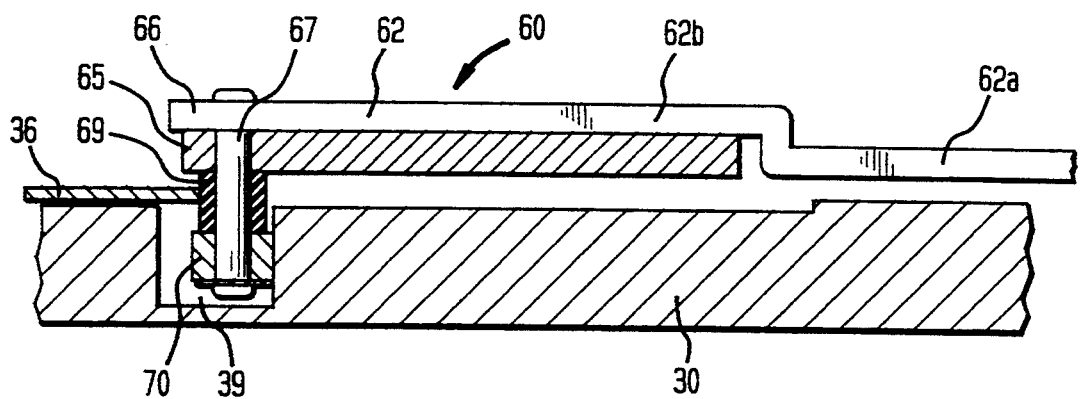
FIG. 10 is a cross sectional view of a shutter operating mechanism of another cassette tape mount according to the present invention.
Figure 11:
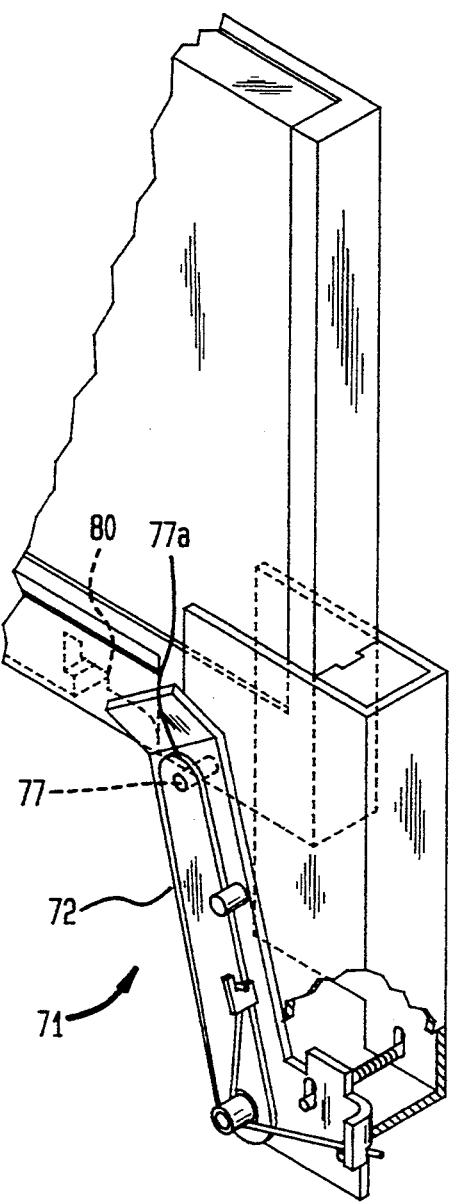
FIG. 11 is a perspective view of a shutter operating mechanism of a cassette tape mount which has been proposed by the applicant of the present invention.

FIG. 10 is a cross sectional view of a shutter operating mechanism of a cassette tape mount according to a second example of the present invention. The cassette tape mount according to the second example is distinct from the cassette tape mount according to the first example in the construction of the shutter operating mechanism 60.

The shutter operating shaft 67 of the shutter operating mechanism 60 has the guide roller 69 and a contact roller 70 both rotatably supported by the shutter operating shaft 67. The contact roller 70 has a larger diameter than that of the guide roller 69. For mounting the DCC 30, the contact roller 70 rotates while sliding along the guide 39, and the guide roller 69 rotates while sliding along the edge of the shutter 36, thereby sliding open the shutter 36 with respect to the cassette main body 31. Owing to the difference in diameter, the guide roller 69 does not contact the guide 39, and the contact roller 70 does not contact the edge of the shutter 36.

In the cassette tape mount having the above construction, when the DCC 30 is first inserted, the contact roller 70 and the guide roller 69 are put in the notch 39a of the guide 39. The contact roller 70 contacts the guide 39, but the guide roller 69 does not. When the DCC 30 is further inserted, the contact roller 70 rotates while sliding along the guide 39, and thus the guide roller 69 contacts the edge of the shutter 36 and rotates while sliding along the edge of the shutter 36, thereby sliding open the shutter 36 with respect to the cassette main body 31. Since the contact roller 70 is rotated independently from the guide roller 69, the sliding movement of the contact roller 70 along the guide 39 is smooth. When the contact roller 70 and the guide roller 69 are recessed in the look groove 40, the shutter 36 is locked with the openings 33 through 35 being uncovered.

For removing the DCC 30 from the cassette tape mount, the arm 62 and the other members of the cassette tape mount and the DCC 30 are operated oppositely.

The ACC 50 is inserted into and removed from the cassette tape mount according to the second example in the same manner as in the first example.

In the cassette tape mount according to the second example, the contact roller 70 rotates while sliding along the guide 39, thereby sliding the shutter 36 more smoothly.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A cassette tape mount for use in a cassette tape recorder for receiving a tape cassette which houses a magnetic tape having a stretched portion and includes an opening in a face of the tape cassette for exposing the stretched portion of the magnetic tape, the tape cassette further having a shutter over the face which is slidable with respect to the face to cover and uncover the opening, the cassette tape mount comprising a body and a shutter operating mechanism for sliding open the shutter to uncover the opening when the tape cassette is inserted into the cassette tape mount, wherein the shutter operating mechanism comprises:
an arm pivotally mounted to the body and biased to pivot away from the body by a spring and to pivot towards the body when the tape cassette is inserted into the cassette tape mount;
a shutter operating shaft provided at an end of the arm and having a cassette contact portion to slide along the face of the tape cassette; and
a guide roller journalled to rotate about the shutter operating shaft and rotate against the shutter of the tape cassette to engage an edge of the shutter and thus to slide the shutter along the face of the tape cassette to uncover the opening.

2. A cassette tape mount according to claim 1, wherein the cassette contact portion of the shutter operating shaft has a larger diameter than the diameter of the guide roller so as to control the cassette contact portion to contact the face of the tape cassette but not to contact the shutter.

3. A cassette tape mount according to claim 1, for receiving a tape cassette which houses a magnetic tape having a stretched portion and includes an uncovered opening for exposing the stretched portion of the magnetic tape, the tape cassette further having a thick portion about the opening, the thick portion being thicker in a width direction of the magnetic tape than the face of the tape cassette having a shutter, wherein the arm further includes a contact plate positioned to slide along a periphery of the thick portion of the tape cassette in the direction in which a portion of the magnetic tape is stretched when the tape cassette is inserted into the cassette tape mount.

4. A cassette tape mount according to claim 3, wherein the arm has a flange at a tip thereof for engagement with the periphery of the thick portion of the tape cassette.

5. A cassette tape mount for use in a cassette tape recorder for receiving a tape cassette which houses a magnetic tape having a stretched portion and includes an opening in a face of the tape cassette for exposing the stretched portion of the magnetic tape, the tape cassette further having a shutter over the face which is slidable with respect to the face to cover and uncover the opening, the cassette tape mount comprising a body and a shutter operating mechanism for sliding open the shutter to uncover the opening when the tape cassette is inserted into the cassette tape mount, wherein the shutter operating mechanism comprises:
an am pivotally mounted to the body and biased to pivot away from the body by a spring and to pivot towards the body when the tape cassette is inserted into the cassette tape mount;
a shutter operating shaft provided at an end of the arm;
a contact roller journalled to rotate about the shutter operating shaft and rotate while rolling along the tape cassette; and
a guide roller journalled to rotate about the shutter operating shaft and rotate against the shutter of the tape cassette to engage an edge of the shutter and thus to slide the shutter along the face of the tape cassette to uncover the opening.

6. A cassette tape mount according to claim 5, for receiving a tape cassette which houses a magnetic tape having a stretched portion and includes an uncovered opening for exposing the stretched portion of the magnetic tape, the tape cassette further having a thick portion about the opening being thicker in a width direction of the magnetic tape than the face of the tape cassette having a shutter in the width direction of the magnetic tape, wherein the shutter operating mechanism further includes a contact plate provided on a surface of the arm, the arm being positioned along a periphery of the thick portion of the tape cassette when the tape cassette is inserted into the cassette tape mount.

7. A cassette tape mount according to claim 6, wherein the arm has a flange at a tip thereof for engagement with the periphery of the thick portion of the tape cassette.

8. A cassette tape mount for use in a cassette tape recorder, comprising a body and a shutter operating mechanism for sliding open a shutter of a tape cassette, the shutter operating mechanism including:
an arm pivotally mounted to the body and biased to pivot away from the body by a spring and to pivot towards the body when the tape cassette is inserted into the cassette tape mount;
a shutter operating shaft provided at an end of the arm and having a cassette contact portion to slide along the face of the tape cassette; and
a guide roller journalled to rotate about the shutter operating shaft and rotate against the shutter of the tape cassette to engage an edge of the shutter and thus to slide the shutter along the face of the tape cassette to uncover the opening in the face.

* * * * *

UNITED STATES PATENT AND TRADEMARK OFFICE
CERTIFICATE OF CORRECTION

PATENT NO.    : 5,406,430
DATED         : April 11, 1995
INVENTOR(S)   : Shinohara et al.

It is certified that error appears in the above-identified patent and that said Letters Patent is hereby corrected as shown below:

Column 1, line 62, delete "hereof" and insert therefor --thereof--.

Column 10, line 19, delete "am" and insert therefor --arm--.

Signed and Sealed this

Fifth Day of September, 1995

Attest:

BRUCE LEHMAN

*Attesting Officer*   *Commissioner of Patents and Trademarks*